Oct. 12, 1965  J. J. ZELINSKI  3,210,928
FUEL COOLED COMBUSTOR ASSEMBLY
Filed Aug. 19, 1960  3 Sheets-Sheet 1
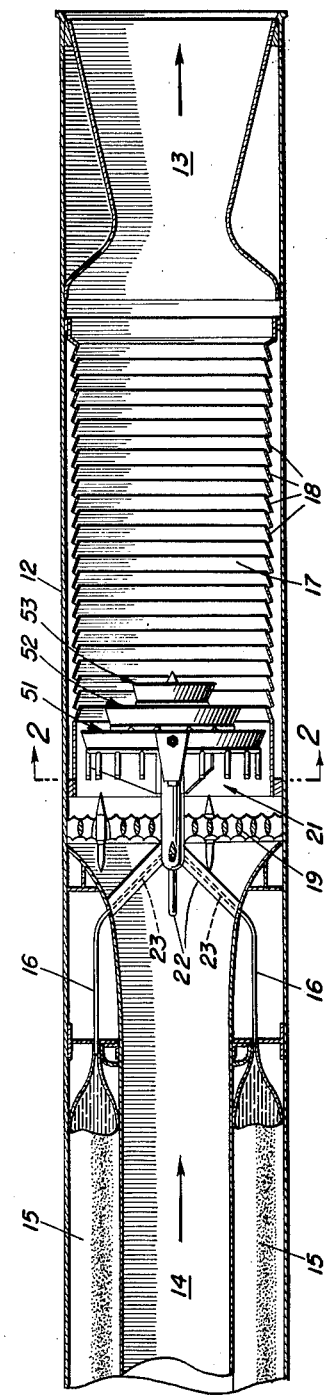
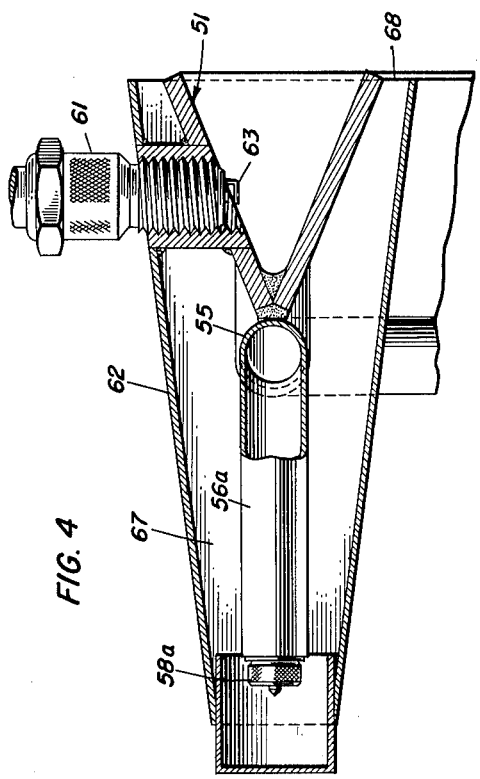
INVENTOR
Joseph J. Zelinski
BY
ATTORNEYS
AGENT Oct. 12, 1965    J. J. ZELINSKI    3,210,928
FUEL COOLED COMBUSTOR ASSEMBLY
Filed Aug. 19, 1960    3 Sheets-Sheet 3

INVENTOR
Joseph J. Zelinski

BY

ATTORNEYS

AGENT

United States Patent Office 3,210,928
Patented Oct. 12, 1965

3,210,928
FUEL COOLED COMBUSTOR ASSEMBLY
Joseph J. Zelinski, North Andover, Mass., assignor to the United States of America as represented by the Secretary of the Navy
Filed Aug. 19, 1960, Ser. No. 50,810
3 Claims. (Cl. 60—35.6)

This invention relates generally to combustor assemblies for ramjet engines and more particularly to a three-dimensional system of fuel cooled gutter-type flameholders with contra-stream fuel injectors mounted thereon.

The very high temperatures encountered in the ramjet engines of missiles and aircraft which are capable of traveling at speeds of four to five times the speed of sound favor rapid fuel vaporization and combustion and thus permit the use of a simple, low drag configured combustor assembly. However, several factors preclude the use of any known combustor assembly in such a missile or aircraft. One of these factors is that conventional combustor assemblies cannot withstand the high temperatures and structural stresses generated therein. In addition, another factor is that conventional combustor assemblies are not capable of maintaining combustion flame stability through a wide range of missile or aircraft speeds. This requirement for flame stabilization is derived from the fact that conventional booster means will only boost the missile or aircraft to a speed of Mach 1–2. Thereafter, the ramjet engine operation must be initiated to increase the speed to the operational range of Mach 4 to 5 or higher.

Other considerations in the design of a combustor assembly are that it be simple in construction thereby permitting increased dependability and reliability, and that it have a low drag configuration to permit maximum efficiency by minimizing air flow obstruction.

Accordingly, it is an object of the present invention to provide a combustor assembly for a ramjet engine capable of propelling an aircraft at speeds of many times the speed of sound.

Another object of the present invention is to provide a novel combustor assembly with improved means to dissipate heat therefrom.

Another object of this invention is to provide a combustor in which the fuel nozzles are integral with the flameholder.

Still another object of this invention resides in the provision of a novel combustor assembly in which all major parts thereof are internally cooled.

Yet another object of the present invention is to provide a combustor assembly comprising a three-dimensional system of gutter-type flameholders with contra-stream fuel injectors mounted thereon.

Another object of the hereindescribed invention provides a novel combustor assembly comprising a series of axially spaced gutters of progressively varying diameters.

Other objects and many of the attendant advantages of this invention will be readily appreciated as the same becomes better understood by reference to the following detailed description when considered in connection with the accompanying drawings wherein:

FIG. 1 is a partial longitudinal sectional view of a guided missile utilizing the present invention;

FIG. 4 is a sectional view substantially along the line 4—4 of FIG. 2.

Figure 2:
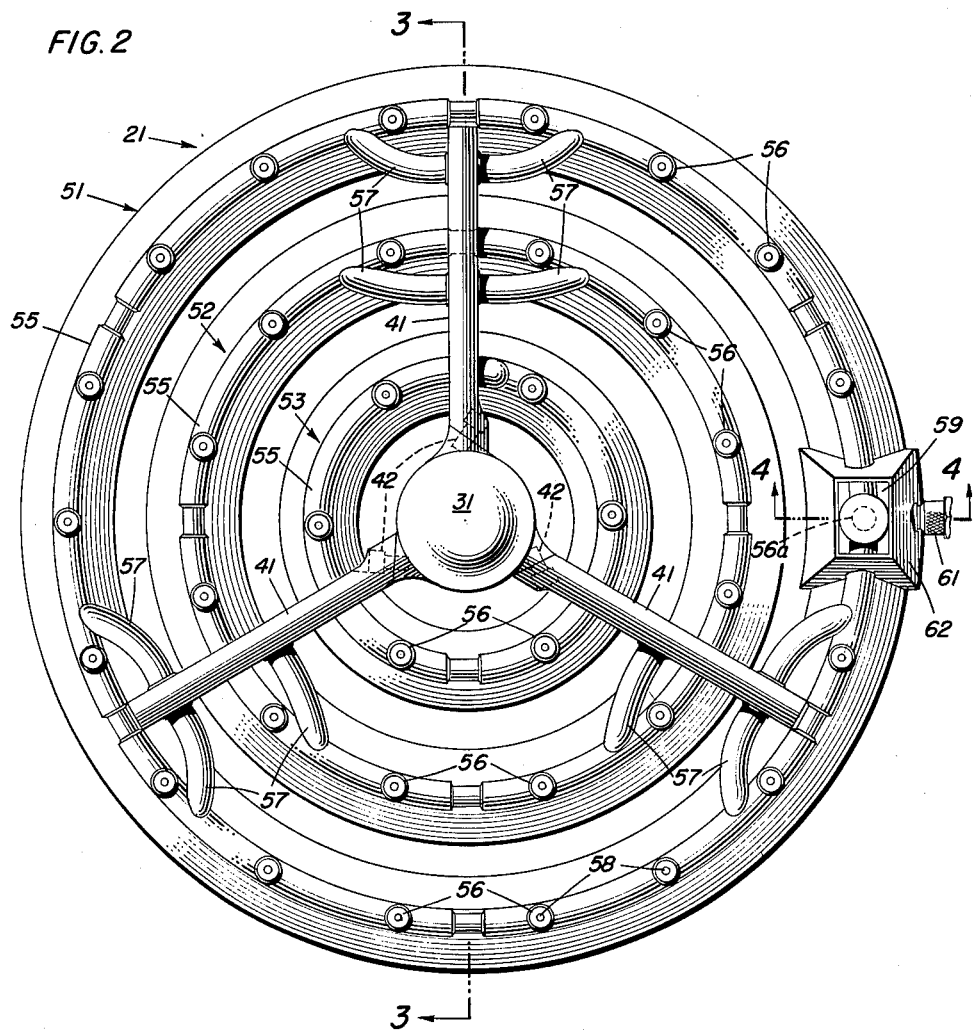
FIG. 2 is a sectional view as viewed from a line substantially corresponding to line 2—2 of FIG. 1.

FIG. 1 of the drawing is a partial sectional view illustrating a guided missile having an outer casing 12 which also serves as the housing for a ramjet engine. The ramjet engine has an air-intake passageway 14 which channels intake air to the novel combustor assembly indicated generally by the numeral 21. Located between the outer casing 12 and the air-intake passageway 14 are fuel tanks 15 which communicate, through conduits 16, with the combustor assembly 21. Immediately downstream from the combustor assembly is a combustion chamber 17 having sidewalls constructed of corrugated cooling shrouds 18. At the downstream end of this combustion chamber is located an exhaust nozzle 13 which produces thrust when the high pressure gases produced in the combustion chamber 17 are expanded therethrough.

Figure 3:
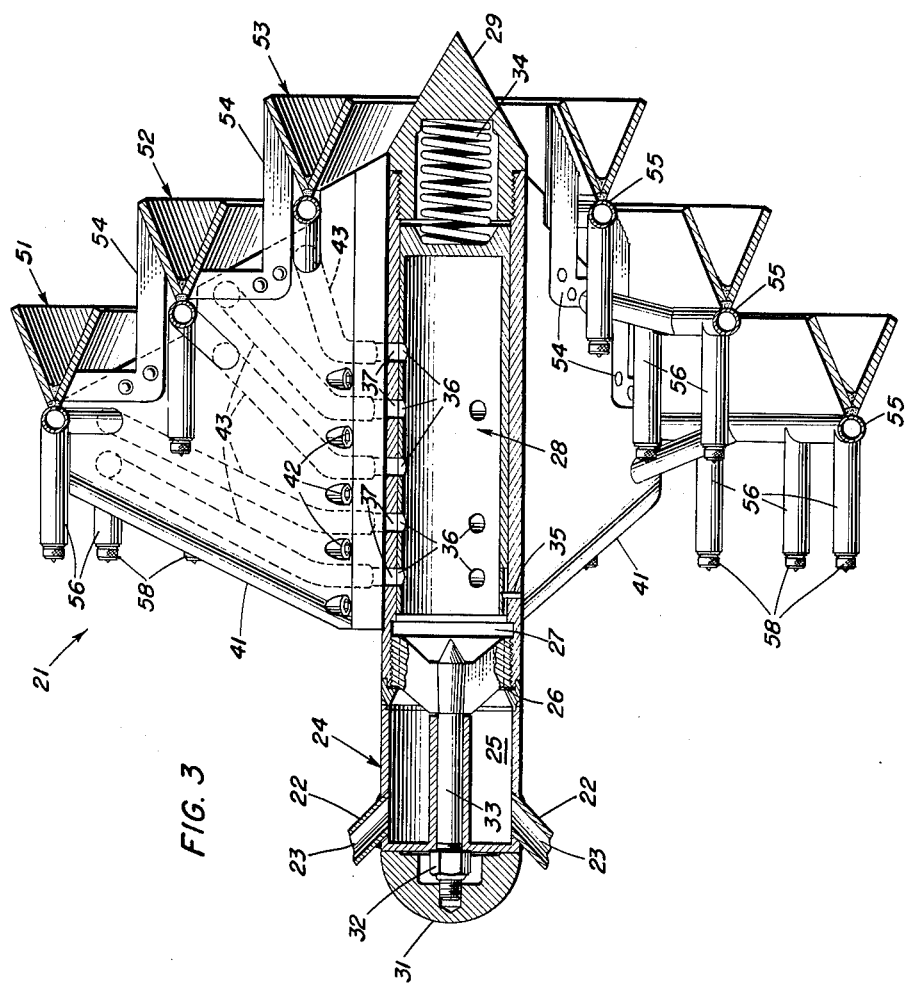
FIG. 3 is a sectional view substantially along the line 3—3 of FIG. 2.

The combustor assembly 21 is supported in the ramjet engine primarily by hollow struts 22. These struts have fluid conduits or passages 23 therein and together with conduit 16 permit fluid communication between fuel tanks 15 and the interior of the valve housing 24. The air-straightener 19 serves the dual purposes of suppressing turbulence in the intake air and supporting the combustor assembly 21. The valve housing 24 is composed of a series of disengageable sub-assemblies thereby permitting rapid assembly or disassembly. More specifically, by removing nut cover 31 and nut 32 from connector bolt 33 the entire combustor assembly 21, save the struts 22 and upstream portion 25 of valve housing 24, can be removed from the engine in a down-stream direction. Inserted between the upstream portion 25 and the downstream portion 27 of the valve housing 24 is a metallic seal 26 which is utilized to make the valve housing fluid tight. Cylindrical valve member 28 is slidably mounted in the downstream portion 27 of valve 24. This valve member 28 may be removed from its housing 27 by removing plug 29 and spring 34. Spring 34 normally biases the valve member in an upstream direction as shown best in FIG. 3. Pin 35 limits the upstream motion of the valve 28.

The valve 28 has a series of ports 36 therein which communicate with passages 37 in the upstream portion 27 of valve housing 24.

Three flameholder struts 41 are rigidly secured to the valve housing 24 by fastening means 42, as best shown in FIG. 2. These flameholder struts 41 have a plurality of passageways 43 therein which are in fluid communication with the passages 37 of the valve housing 24. The struts 41 support an outer gutter 51, an intermediate gutter 52 and an inner gutter 53. The L-shaped members 54 are rigidly fastened to the flameholder struts 41 and the gutters 51, 52, and 53 in a manner to add structural support to the gutters.

At the apex or vertex of each gutter is rigidly secured a fuel conduit 55. These fuel conduits are fabricated from a series of sections each having a plurality of fuel stubs 56 mounted thereon as seen best by reference to FIG. 2. The fluid conduits in struts 41 act as manifolds in supplying fuel to the fuel conduits 55. FIG. 2 of the drawings best illustrates the conduits 57 which permit fluid communication between the strut 41 and the fuel conduit sections 55. The fuel stubs 56 have fuel injection nozzles 58 mounted therein in the manner illustrated in FIG. 3.

FIG. 4 of the drawing illustrates an ignition system which may be utilized with the aforementioned combustor assembly. Spark plug 61 having electrodes 63 is mounted in the outer gutter 51 in a manner which permits shielding of the electrodes 63 from the approaching fuel-air mixture. A shroud 62 is positioned around the fuel stub 56a and its nozzle 58a. Intake air passes through openings 59 in the shroud 62 and into the chamber 67 where it is mixed with fuel from nozzle 58a. This mixture moves at a relatively slow speed in order that it may be easily ignited after passing through opening 68 and into the proximity of electrode 63. The specific structure of this ignition means, as described above, is but one example of the many well known types of such means.

To operate the hereindisclosed ramjet engine, it is first necessary to bring the missile in which the engine is mounted, and consequently the ramjet engine, up to minimum operational speed. This minimum speed varies with the particular engine and normally is in the range of Mach 1–3. This can be accomplished in any number of ways, the most widely utilized means being by the use of a rocket booster or by mounting the missile on the wing of a high speed aircraft and bringing the aircraft up to this minimum operational speed.

When the minimum operational speed is attained, the engine operation can be commenced. This occurs by first pressurizing the fuel tanks 15, or in any other conventional manner, causing the fuel therein to flow through line 16, struts 22, into the valve housing 24. As the pressure inside of the valve housing 24 increases, the valve element 28 is moved by the pressure in a downstream direction, as viewed in FIG. 3, thereby compressing the spring 34. As the valve means 28 moves, fluid communication is established between ports 36 and passageways 37 in the valve housing 24. Fuel then begins to flow through these passageways, through the conduits 43 in the gutter struts 41 and into the fuel conduits 55 mounted on each of the three gutter means. From the fuel conduits the fuel flows through the fuel stubs 56, then through the nozzles 58 to the intake air stream.

Simultaneously with the injection of fuel into the intake air, the ignition means described above is initiated. Due to the configuration of the starter means, namely baffle 62, a very lean mixture of fuel flows through the openings 68 and into the general area surrounding electrodes 63. The ignition means 61 ignites the fuel air mixture in the vicinity of its electrodes 63, and this ignition in turn, spreads rapidly throughout the entire combustion chamber. Once the fuel air mixture in the combustion chamber is ignited the ignition means 61 may be deactivated as the combustion will then support itself. Should a "flameout" or "blowout" occur, the ignition means is available to again ignite the combustible mixture in the combustion chamber.

The annular gutters or baffles 51, 52, and 53 are spaced axially from each other and are of progressively varying diameters, e.g., 2.2″, 4.4″, 6.6″. This arrangement or configuration is capable of maintaining combustion through a missile or aircraft velocity range of Mach 1 to 5 and perhaps higher.

To briefly explain the operation of this three-dimensional gutter-type flameholder, it is to be first understood that the gutters create an irregular re-circulating eddy system. This system acts as a continuous source of ignition due to production of an inverted flame, that is, a flame which originates immediately upstream from the flameholder and spreads therefrom obliquely across the explosive flow. The re-circulating eddy system receives heat from this flame and carries it back upstream, thereby continuously igniting the flow of explosive mixture.

The precise configuration as shown in the drawings and described hereinbefore can be varied slightly without departing from the scope of the invention. For example, it is within the contemplation of this invention that a half-gutter type mixer could replace any one of the three gutters illustrated or that such a half-guter or any other conventional mixer could be placed between any of the three gutters. Mixers utilized to increase turbulence are well known in the art and it is sufficient to state that it would be within the ability of one skilled in the art to adapt the use of such mixers to the present invention.

As has been mentioned, the heat developed in the ramjet engine when it is moving at speeds in the range of Mach 4 to 5 and higher is extremely high. It is therefore necessary that all components of the engine including the combustor assembly be capable of withstanding these high temperatures.

The novel cooling of the instant combustor assembly is performed by circulating a liquid through all major portions of the assembly. The liquid used in the instant invention is the fuel. Flow of fuel through the major portions to the ejection nozzles provides several highly advantageous results. For example, the combustor assembly is cooled and the fuel is heated. Increasing the fuel temperature prior to its injection into the combustion chamber permits it to vaporize more readily and, consequently, ignite more rapidly. The cooling is performed as the fuel flows through the struts 23, the valve housing 24, valve ports 36, gutter struts 41, fuel conduits 57 and 55, fuel stubs 56, and the fuel nozzles. This flow tends to cool all parts through which it passes, as well as all those components which are directly connected thereto. For example, the fuel conduits 55 are rigidly connected to the gutters 51, 52, and 53 and, consequently, the fuel flow through these fuel conduits dissipates the heat from the gutters. Thus, it is seen that each section and component of the combustor assembly is cooled, thereby obviating possible failure due to excessive temperature.

The burning gases pass downstream from the combustor assembly to the combustion chamber where they are substantially completely burned thereby producing a high gas pressure. These gases are then expanded through the rocket nozzle 13 thereby imparting thrust to the missile.

Obviously many modifications and variations of the present invention are possible in the light of the above teachings. It is therefore to be understood that within the scope of the appended claims, the invention may be practiced otherwise than as specifically described.

What is claimed is:

1. A combustor assembly for a ramjet engine comprising fuel supply means, valve means connected to and supported by said fuel supply means, said valve means comprising inner and outer sleeve means having apertures therein, said apertures being in misalignment under static non-flow conditions, and compressible spring means connected to said inner sleeve in a manner whereby said apertures are aligned in response to fuel pressure allowing fuel flow through said inner and outer sleeve apertures, air flow straightening means connected to and supporting said valve means, nozzle means connected to and supported by said valve means, frameholder means also connected to and supported by said valve means through fuel conduit means for supplying fuel to said nozzle means thereby dissipating heat from said flameholder means and heating said fuel, said flameholder means comprising a plurality of annular baffles of progressively varying diameters spaced axially along the longitudinal axis of said engine and having an angular cross section with the vertex thereof projecting in an upstream direction of said engine.

2. A combustor assembly according to claim 1 wherein said valve means comprises a downstream cap threadably engaged with said outer sleeve, said cap having an internal cavity for seating said compressible spring, and an upstream cap having fuel inlet orifices and a threaded bolt means for engagement with said outer sleeve.

3. A combustor assembly according to claim 1 further including ignition means connected to and supported by said flameholder means, said ignition means comprising a shroud for at least a portion of at least one of said annular baffles and a sparkplug shielded in said baffle.

References Cited by the Examiner

UNITED STATES PATENTS

| | | | |
|---|---|---|---|
| 2,656,676 | 10/53 | Kallal | 60—35.6 |
| 2,672,011 | 3/54 | Von Zborowski. | |
| 2,704,435 | 3/55 | Allen | 60—35.6 |
| 2,762,584 | 9/56 | Price. | |
| 2,929,211 | 3/60 | Meyer et al. | 60—39.72 X |
| 2,944,399 | 7/60 | McCardle et al. | 60—39.72 X |
| 2,954,667 | 10/60 | Laurent et al. | 60—35.6 |
| 2,955,414 | 10/60 | Hausmann | 60—35.6 |
| 2,957,308 | 10/60 | McMurtrey et al. | 60—35.6 |
| 2,968,147 | 1/61 | Truly et al. | 60—35.6 |
| 3,030,768 | 4/62 | Yahnke | 60—39.28 |

MARK NEWMAN, *Primary Examiner.*

SAMUEL FEINBERG, *Examiner.*